United States Patent
Moulsley (10) Patent No.: US 10,390,198 B2
(45) Date of Patent: Aug. 20, 2019

(54) COVERAGE EXTENSION IN WIRELESS COMMUNICATION

(71) Applicant: FUJITSU LIMITED, Kawasaki-shi, Kanagawa (JP)

(72) Inventor: Timothy Moulsley, Caterham (GB)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 15/209,329

(22) Filed: Jul. 13, 2016

(65) Prior Publication Data

US 2016/0323696 A1    Nov. 3, 2016

Related U.S. Application Data

(63) Continuation of application No. PCT/EP2014/061901, filed on Jun. 6, 2014.

(30) Foreign Application Priority Data

Mar. 14, 2014    (EP) .................................. 14160123

(51) Int. Cl.
*H04L 1/00* (2006.01)
*H04L 1/08* (2006.01)
(Continued)

(52) U.S. Cl.
CPC .............. *H04W 4/70* (2018.02); *H04L 1/001* (2013.01); *H04L 1/08* (2013.01); *H04W 16/32* (2013.01);
(Continued)

(58) Field of Classification Search
CPC .......... H04J 3/06; H04J 11/0053; H04W 4/00; H04W 4/005; H04W 16/32; H04W 48/12;
(Continued)

(56) References Cited

U.S. PATENT DOCUMENTS

| 2013/0064239 A1* | 3/2013 | Yu ........................ H04W 72/046 370/350 |
| 2014/0185573 A1* | 7/2014 | Yoon .................... H04J 11/0053 370/329 |
| 2016/0057784 A1* | 2/2016 | You ....................... H04W 88/04 370/329 |

FOREIGN PATENT DOCUMENTS

| CN | 101043494 A | 9/2007 |
| CN | 102170335 A | 8/2011 |
| GB | 2484921 A | 5/2012 |
| JP | 2013-544464 A | 12/2013 |
| WO | 2013/019016 A2 | 2/2013 |

OTHER PUBLICATIONS

International Search Report with Written Opinion of the International Searching Authority issued for corresponding International Patent Application No. PCT/EP2014/061901, dated Nov. 6, 2014.
(Continued)

*Primary Examiner* — Jung H Park
(74) *Attorney, Agent, or Firm* — Myers Wolin, LLC (57) ABSTRACT

In a wireless communication system, two cells (cell 1, cell 2) co-exist in the same time/frequency resources with the same Cell ID. The two cells are differentiated by one being a legacy cell and the other being a cell in which coverage extension by means of signal repetition is applied. There is a corresponding difference in broadcast control channels transmitted by a base station (11) providing the two cells, for example a difference in one or more of the contents of the PBCH, or the repetition factor on the PBCH, and/or a difference in a higher-level ID. The second cell is intended for machine type communication where coverage enhancement is required.

13 Claims, 5 Drawing Sheets

(51) Int. Cl.
  *H04W 4/70*    (2018.01)
  *H04W 16/32*   (2009.01)
  *H04W 48/12*   (2009.01)
  *H04W 72/00*   (2009.01)
  *H04W 74/08*   (2009.01)

(52) U.S. Cl.
  CPC ......... *H04W 48/12* (2013.01); *H04W 72/005* (2013.01); *H04W 74/0833* (2013.01)

(58) Field of Classification Search
  CPC ... H04W 72/00; H04W 74/08; H04W 72/046; H04L 5/00
  See application file for complete search history.

(56) References Cited

OTHER PUBLICATIONS

Extended European search report with supplementary European search report and the European search opinion issued by the European Patent Office for corresponding European Patent Application No. 14160123.7, dated Nov. 5, 2014.

Alcatel-Lucent et al., "Feasibility of coverage extension of physical channels for MTC devices", Agenda Item: 7.3.4, 3GPP TSG-RAN WG1 Meeting #72, R1-130462, St. Julian's, Malta, Jan. 28-Feb. 1, 2013.

Alcatel-Lucent et al., "Coverage enhancement mode operation", Agenda Item: 7.9.2, 3GPP TSG-RAN WG2 Meeting #85, R2-140728, Prague, Czech Republic, Feb. 10-14, 2014.

3GPP TR 36.913 Technical Report, "3rd Generation Partnership Project; Technical Specification Group Radio Access Network; Requirements for further advancements for Evolved Universal Terrestrial Radio Access (E-UTRA) (LTE-Advanced) (Release 11)," Sep. 2012.

Third Notice of Preliminary Rejection issued by the Korean Intellectual Property Office for corresponding Korean Patent Application No. 10-2016-7021719, dated Jul. 25, 2018, with English translation.

First Notification of Office Action issued by the State Intellectual Property Office of China for corresponding Chinese Patent Application No. 201480076783.X, dated Aug. 24, 2018, with an English translation.

* cited by examiner

COVERAGE EXTENSION IN WIRELESS COMMUNICATION

CROSS REFERENCES TO RELATED APPLICATIONS

This application is a continuation application of International Patent Application No. PCT/EP2014/061901, filed Jun. 6, 2014, and claims priority to European Patent Application No. EP14160123.7 filed Mar. 14, 2014 the contents of each are herein wholly incorporated by reference.

FIELD OF THE INVENTION

The present invention relates to a wireless communication system comprising a base station and terminals for wirelessly exchanging data with the base station. The present invention further relates to a wireless communication system, a terminal, to a base station and a computer program for use in said method.

Particularly, but not exclusively, the present invention relates to coverage extension in a wireless communication system compliant with the LTE (Long Term Evolution) and LTE-Advanced radio technology standards as described in Release 11 and subsequent of the 3GPP specification series.

BACKGROUND OF THE INVENTION

Wireless communication systems are widely known in which base stations (BSs) provide "cells" and communicate with terminals within range of the BSs. In LTE for example, the base stations are generally called eNodeBs or eNBs and the terminals are called user equipments or UEs.

Figure 1:
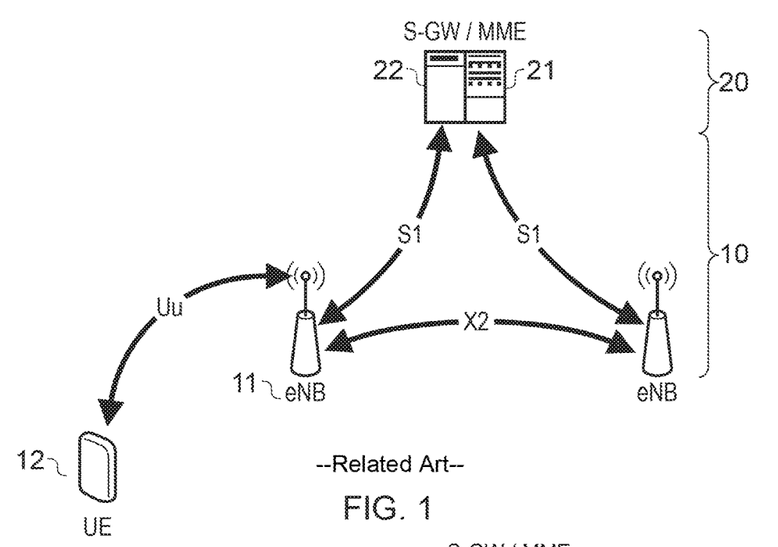
FIG. 1 shows the basic system architecture in a LTE-based wireless communication system.

The network topology in LTE is illustrated in FIG. 1. As can be seen, each terminal or UE 12 connects over a wireless link via a Uu interface to a base station or eNodeB 11, and the network of eNodeBs is referred to as the eUTRAN 10. The eNBs generally have multiple physical antennas capable of being configured as "antenna ports" in various configurations. This allows various transmission schemes to be employed between the eNB and UE including Multiple-Input, Multiple-Output (MIMO) and beamforming.

Each eNodeB 11 in turn is connected by a (usually) wired link using an interface called S1 to higher-level or "core network" entities, including a Serving Gateway (S-GW 22), and a Mobility Management Entity (MME 21) for managing the system and sending control signalling to other nodes, particularly eNodeBs, in the network. In addition, a PDN or Packet Data Network Gateway (P-GW) is present, separately or combined with the S-GW 22, to exchange data packets with any packet data network including the Internet. The core network 20 is called the EPC or Evolved Packet Core.

Whilst LTE was originally conceived to serve mobile telephones of human users, increasing attention is being paid to Machine-to-Machine (M2M) Communication Machine-to-Machine (M2M) communication, usually referred to in the context of LTE as Machine Type Communication (MTC), is a form of data communication which involves one or more entities that do not necessarily need human interaction; in other words the 'users' may be machines.

MTC is different from current communication models as it potentially involves very large number of communicating entities (MTC devices) with little traffic per device. Examples of such applications include: fleet management, smart metering, product tracking, home automation, e-health, etc.

MTC has great potential for being carried on wireless communication systems (also referred to here as mobile networks), owing to their ubiquitous coverage. However, for mobile networks to be competitive for mass machine-type applications, it is important to optimise their support for MTC. Current mobile networks are optimally designed for Human-to-Human communications, but are less optimal for machine-to-machine, machine-to-human, or human-to-machine applications. It is also important to enable network operators to offer MTC services at a low cost level, to match the expectations of mass-market machine-type services and applications.

In addition, MTC devices may be located in areas with very poor coverage (i.e., low SINR), and it is desirable to be able to provide some kind of service even under such conditions.

To fully support these service requirements, it is necessary to improve the ability of mobile networks to handle machine-type communications.

Figure 2:
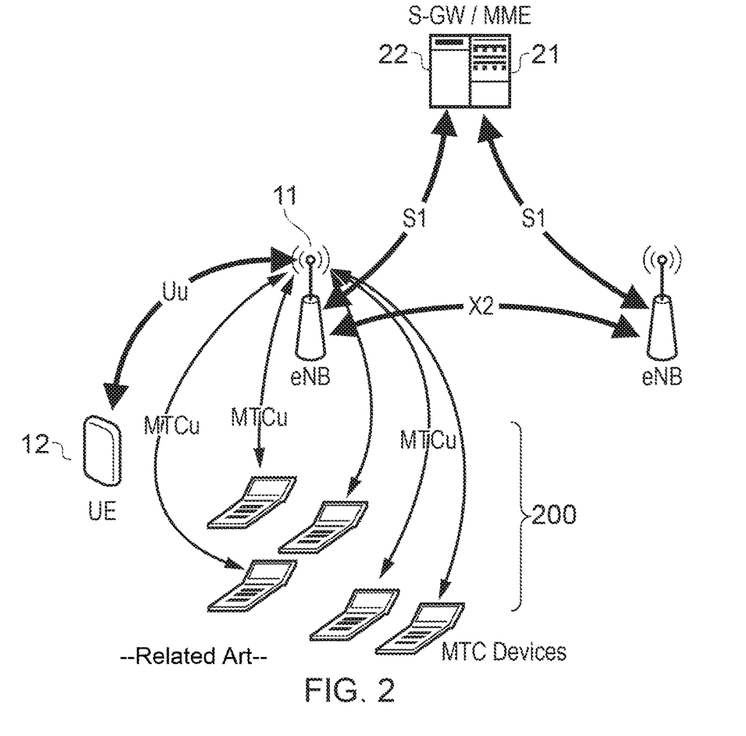
FIG. 2 shows the system architecture of FIG. 1 modified to include MTC devices.

In the LTE network illustrated in FIG. 2, a group of MTC devices 200 is served by an eNodeB 11 which also maintains connections with normal UEs 12. The eNodeB receives signalling from the MME 21 and data (for example, a request for a status report from a supervisor of the MTC devices) via the S-GW 22.

In case the Uu interface is not always sufficient, there may be a MTCu interface defined analogous to the Uu interface, and the MTC devices will be served in a similar way to normal user equipments by the mobile networks. When a large number of MTC devices connect to the same cell of a UMTS RNS or an LTE eNodeB, each of the devices will need resources to be allocated to support the individual devices' applications even though each MTC device may have little data.

In the remainder of this specification, the term "UE" includes "MTC device" unless otherwise demanded by the context.

Figure 3:
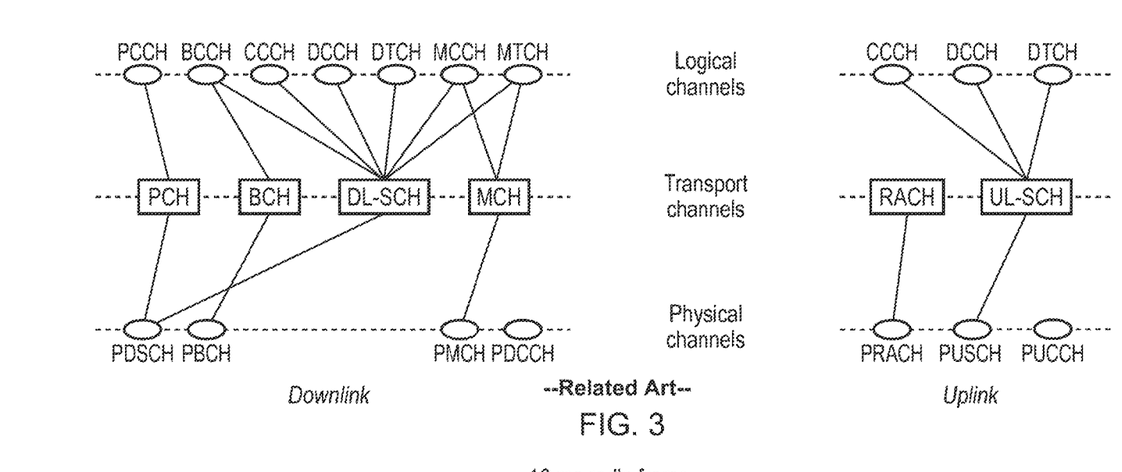
FIG. 3 shows relationships between various uplink channels defined in LTE.

In LTE, several channels for data and control signalling are defined at various levels of abstraction within the system. FIG. 3 shows some of the channels defined in LTE at each of a logical level, transport layer level and physical layer level, and the mappings between them.

At the physical layer level, on the downlink, each eNB broadcasts a number of channels and signals to all UEs within range, whether or not the UE is currently being served by that cell. Of particular interest for present purposes, these include a Physical Broadcast Channel PBCH as shown in FIG. 3. PBCH carries a so-called Master Information Block (MIB), which gives, to any UEs within range of the signal, basic information as described below. Primary and Secondary Synchronization Signals (PSS/SSS) are also broadcast to all devices within range. In addition to establishing a timing reference for a cell, these carry a physical layer cell identity and physical layer cell identity group for identifying the cell.

504 possible values of physical layer cell identity (PCI) are defined in LTE. These are arranged hierarchically in 168 unique cell layer identity groups each containing three physical layer identities. To express this cell ID, the PSS specifies one of three values (0, 1, 2) to identify the cell's physical layer identity, and the SSS identifies which one of the 168 groups the cell belongs to. In this way it is only necessary for PSS to express one of three values whilst SSS expresses one of 168 values.

Below, the term "cell ID" refers to the physical cell identity (PCI) unless stated otherwise. It should be noted that two related higher-level cell IDs are also defined in LTE. The E-UTRAN cell identity (ECI) identifies a cell within a particular network, while the E-UTRAN cell global identifier (ECGI) identifies a cell anywhere in the world. The ECI is carried in SIB1 referred to later, and the ECGI is the combination of the ECI with a PLMN (Public Mobile Land Network) number of the network.

Figure 4A:
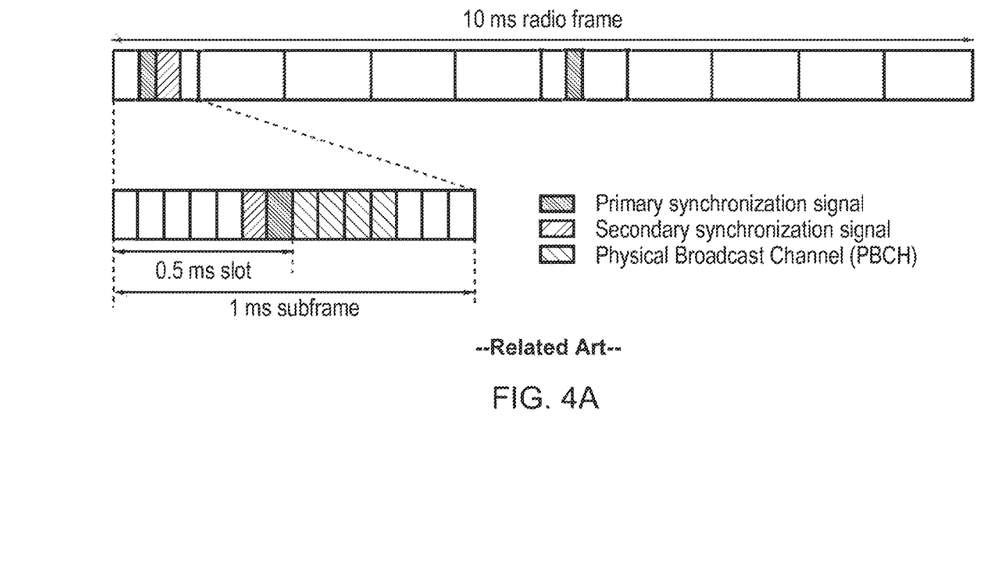
FIGS. 4A and 4B show timings of PSS/SSS and PBCH in LTE.
Figure 4B:
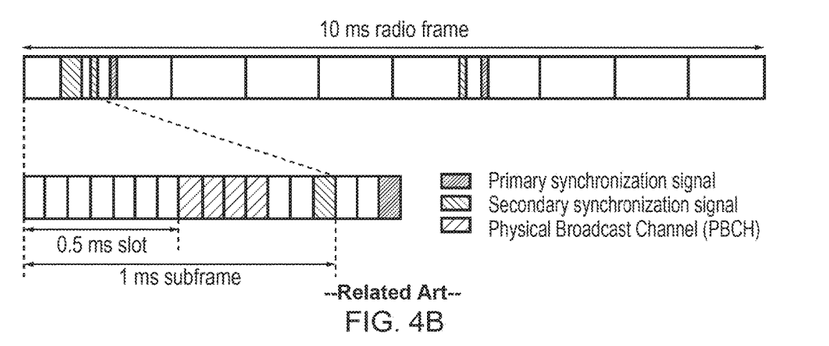

In an LTE system, as shown in FIG. 4A or 4B, transmission is organized in "frames" each 10 ms in duration containing twenty slots of 0.5 ms, two consecutive slots (hence, 1 ms) being referred to as a "subframe". Within each subframe, the resources available in a cell for transmission on DL or UL are scheduled in fundamental units of "resource elements (REs)" each occupying a different combination of timing and frequency. Larger units used for scheduling include the Resource Element Group (REG) where 1 REG=4 REs, and the Control Channel Element (CCE), where 1 CCE=9 continuous REGs.

Conventionally, each of the PSS and SSS is transmitted twice per frame, in other words with a 5 ms periodicity (and consequently, only in some subframes). For example, PSS and SSS are both transmitted on the first and sixth subframe of every frame as shown in FIGS. 4A and 4B. FIG. 4A shows the structure of PSS AND SSS and PBCH in the case of an FDD system, and FIG. 4B shows the same thing in the case of TDD.

Successfully decoding the PSS and SSS allows a UE to obtain the timing and cell ID for a cell.

Once a UE has decoded a cell's PSS and SSS it is aware of the cell's existence and may decode the MIB in the PBCH referred to earlier. Depending on whether the system is using FDD or TDD, PBCH occupies the slots following or preceding PSS and SSS in the first subframe, as can be seen by comparing FIG. 4A and FIG. 4B. Like the synchronization signal SSS, PBCH is scrambled using a sequence based on the cell identity. The PBCH is transmitted every frame, thereby conveying the MIB over four frames.

The MIB includes some of the basic information which the UE needs to join the network, including system bandwidth, number of transmit antenna ports, and system frame number (SFN). Reading the MIB enables the UE to receive and decode the SIBs, in particular SIB1.

The UE will then wish to measure the cell's reference signals (RSs). For current LTE releases, the first step is to locate the common reference signals CRS, the location in the frequency domain of which depends on the PCI. Then the UE can decode the broadcast channel (PBCH). In addition, the UE can decode PDCCH and receive control signalling.

User data as well as System Information Blocks (SIBs) are contained in a transport channel DL-SCH, carried on the Physical Downlink Shared Channel (PDSCH).

The SIBs differ in their information content and are numbered SIB1, SIB2, and so forth. SIB1 contains cell-access related parameters and information on the scheduling of other SIBs. Thus, SIB1 has to be received by a device before it can decode other SIBs such as SIB2. SIB2 contains information including random access channel RACH parameters, referred to below. Currently, SIBs are defined up to SIB14, although not all SIBs need to be received in order for a UE to access the network. For example, SIB10 and SIB11 relate to an Earthquake and Tsunami Warning System. SIB14 is intended for use with so-called Enhanced Access Barring, EAB, which has application particularly to MTC devices.

For network access, generally SIB1 and SIB2 are the most important, in other words, at a minimum, a UE must normally decode SIB1 and SIB2, in that order, in order to communicate with the eNB. In the special case of MTC devices subject to EAB, SIB14 is also important.

The Physical Random Access Channel PRACH, referred to in connection with FIG. 3, will now be explained. As already mentioned, UEs which have obtained timing synchronization with the network will be scheduled with uplink resources which are orthogonal to those assigned to other UEs. PRACH is used to carry the Random Access Channel (RACH) for accessing the network if the UE does not have any allocated uplink transmission resource. Thus, initiation by the UE of the transport channel RACH implies use of the corresponding physical channel PRACH, and henceforth the two terms RACH and PRACH will be used interchangeably to some extent.

Thus, RACH is provided to enable UEs to transmit signals in the uplink without having any dedicated resources available, such that more than one terminal can transmit in the same PRACH resources simultaneously. The term "Random Access" is used because (except in the case of contention-free RACH, described below) the identity of the UE (or UEs) using the resources at any given time is not known in advance by the network (incidentally, in this specification the terms "system" and "network" are used interchangeably). So-called "signatures" (see below) are employed by the UEs to allow the eNB to distinguish between different sources of transmission.

RACH can be used by the UEs in either of contention-based and contention-free modes.

In contention-based access, UEs select any signature at random, at the risk of "collision" at the eNB if two or more UEs accidentally select the same signature. Contention-free access avoids collision, by the eNB informing each UE which signature it may use (and thus implying that the UE is already connected to the network). Contention free RACH is only applicable for handover, DL data arrival and positioning.

There are various control channels on the downlink, which carry signalling for various purposes; in particular the Physical Downlink Control Channel, PDCCH, is used to carry, for example, scheduling information from a base station (called eNB in LTE) to individual UEs being served by that base station. The PDCCH is located in the first OFDM symbols of a slot.

A new control channel design (enhanced PDCCH or EPDCCH) has been defined in 3GPP for LTE. This allows transmit DCI messages to be transmitted in the same resources as currently reserved for downlink data (PDSCH).

The motivation for EPDCCH is as follows. A PDCCH transmission typically contains a payload of around 50 bits (including CRC), with additional channel coding to improve robustness to transmission errors. For some applications, for example where some of the UEs are MTC devices, only small data packets are required, so the PDCCH payload may represent a significant overhead. This may be even more significant for some configurations of TDD, with a limited proportion of subframes allocated for DL transmission. In addition, there is a limit on the maximum number of PDCCH messages that can be transmitted at the same time (i.e. within the same subframe), which may be insufficient to support a large number of active UEs transmitting or receiving only small data packets.

Summarising the above, currently in LTE initial access to access to a cell is typically based on the following procedure (described from a physical layer viewpoint, and where some details may be up to implementation).

(a) UE detects PSS/SSS for one or more cells (possibly on different carrier frequencies)

The sequences used for PSS and SSS indicate the Cell ID.

(b) UE measures received power of CRS for cells for one or more cells for which PSS/SSS is detected. This measurement is Reference Signal Received Power (RSRP).

(c) UE receives PBCH for one or more of the cells for which PSS/SSS is detected. During this process the UE may determine the number of CRS antenna ports (1, 2, or 4) configured by the eNB (e.g. by blind decoding for each of the different possibilities). The PBCH also transmits the master information block (MIB) which contains the system bandwidth, PHICH configuration, system frame number (SFN) and some spare bits. The MIB is repeated four times over 40 ms (4 radio frames). Therefore the SFN timing is obtained by blind decoding with each of the possible timing phases.

(d) UE selects a cell for initial access based on highest metric such as RSRP, and PBCH being received correctly (based on CRC). Note that if the radio channel is so poor that PBCH cannot be received, then the cell is unlikely to be useful for data communication, even if RSRP can be measured.

(e) UE reads System Information Block(s) (SIBs) (at least SIB1) for the selected cell. as already mentioned, SIB1 contains the higher-level ECI cell ID, which is distinct from the PCI.

(f) If the cell is suitable, PRACH is transmitted by the UE, with a power level based on RSRP. If the cell is not suitable for some reason (e.g. the UE subscription does not allow use of that operator's network) a different cell may be selected, probably on a different carrier frequency.

(g) PRACH may be re-transmitted, typically with power ramping, until a response is received from the eNB (indicated on PDCCH and transmitted on PDSCH).

(h) Based on the response from the eNB, the UE sends PUSCH.

Features under discussion in 3GPP for Release 12 of LTE aim to improve support for low cost devices with reduce capabilities, such as MTC devices. An additional requirement is operation under poor coverage conditions (i.e. high pathloss together with reduced transmission/reception capability of the MTC UE). The main mechanism envisaged to provide improved coverage is to apply repetition (or additional repetition), in the time domain and/or frequency domain, to existing physical channels such as PBCH, PDCCH, EPDCCH, PCFICH, PHICH, PDSCH, PRACH PUCCH, PDSCH. This is because repetition of a channel will allow a MTC device to receive (or successfully to transmit) information with a lower SNR than normal. Note that many of the transmission properties of these channels depend on an identifier (Cell ID) associated with the cell in which the channels are used.

Thus, some modifications to the above procedure may be envisaged such as:—

Repetition of the PSS/SSS, which may be detected at step (a).

Repetition of the PBCH, which may be detected at step (c).

Repetition of some SIBs (and/or provision of one or more new SIBs specifically for coverage extension)

Repetition of the PRACH signal transmitted at step (f)

Repetition of PDCCH/EPDCCH, PDSCH, PUSCH at steps (g) and (h).

However, it is envisaged that a cell supporting the coverage extension would also need to support legacy operation (for legacy UEs without the coverage extension feature, and for new UEs in propagation good conditions for which coverage extension is not required).

At least the following transmission characteristics depend on the Cell ID:

PUSCH scrambling, hopping

PUCCH cyclic shift

UL reference signal sequences (unless otherwise configured)

DL channel scrambling (except EPDCCH)

CRS sequence and frequency shift

DMRS sequences (unless otherwise configured).

Consequently, a problem exists of how to efficiently support both legacy operation (for UEs not using coverage extension) together with operation of coverage extension within the resources of one cell and sharing the same resources between the two modes of operation.

SUMMARY OF THE INVENTION

According to a first aspect of the present invention, there is provided a transmission method for use in a wireless communication system wherein:

a base station provides a first cell comprising a first set of resources and a second cell comprising a second set of resources;

a broadcast channel transmitted by the second cell differs from the corresponding broadcast channel transmitted by the first cell;

the first cell and the second cell have the same Cell ID, and at least some of the first set of resources are the same as some of the second set of resources.

The term "cell" here implies a set of resources (time and frequency allocations) available for DL and/or UL transmission to/from a terminal, and a Cell ID. However, the term "cell" in this specification is to be interpreted broadly. For example, it is possible to refer to communication channels associated with a cell being transmitted from or by the cell (on DL), or transmitted to a cell (on UL), even if the transmission or reception is actually carried out by one or more antennas or antenna ports of a base station. The term "cell" is intended also to include sub-cells, which could be sub-divisions of a cell based on using particular antennas or corresponding to different geographical areas within a cell.

The term "Cell ID" generally refers to a physical cell identity such as PCI of LTE.

A "broadcast channel" means a channel which is intended for reception by all terminals within the coverage area of a cell, as distinct from a DL channel intended for a specific terminal.

The sets of resources will generally be defined within the context of a cycle of repeated transmission slots within the system, such as a frame or subframe. As mentioned, there is overlap between the respective sets of resources provided in the first and second cells. However, this does not mean that the same resources are simultaneously allocated in both cells. As will be explained, at least some of the specific resources within both sets of resources can be dynamically configured to be used by either cell in any given subframe, but not by both cells at the same time. Resources may be defined in different domains, for example one or more of time, frequency, code or spatial domains.

Thus, a suitably-equipped terminal (one capable of receiving and decoding the broadcast channel transmitted by the second cell) can use the second cell for its communication with the base station.

In an embodiment of the present invention, the broadcast channel transmitted by the second cell differs in a number of repetitions from the corresponding broadcast channel transmitted by the first cell.

Alternatively or in addition, the broadcast channel transmitted by the second cell differs in information content from the corresponding broadcast channel transmitted by the first cell.

Preferably, the second cell is provided for coverage extension with respect to a coverage area of the first cell.

The method may further comprise detecting the broadcast channel transmitted by the second cell at a Machine-Type Communication, MTC, device. Thus, the MTC device can use the second cell for its communications with the base station.

Preferred embodiments of the present invention are based on LTE. In this case, the broadcast channel may include the Physical Broadcast Channel, PBCH, and/or at least one System Information Block, SIB as defined in LTE.

Additional channels may be transmitted in the first and second cells, at least some of the broadcast channels and/or additional channels being transmitted using the same antennas of a plurality of antennas of the base station.

Different antenna configurations of the same base station may be used for transmission of the broadcast channels of the first and second cells. As one example of this, the broadcast channel in the second cell is transmitted using beamforming with a time-varying beamforming pattern, such as a cyclically-changing beamforming pattern.

The methods referred to above may further comprise a terminal transmitting on a Physical Random Access Channel, PRACH, in the second cell, with a number of repetitions applied to PRACH transmission based on information broadcast by the second cell, or the number of repetitions applied to a channel transmitted by the second cell.

According to a second aspect of the present invention, there is provided a wireless communication system wherein:
 a base station is arranged to provide a first cell comprising a first set of resources and a second cell comprising a second set of resources; wherein
 a broadcast channel transmitted by the second cell differs from the corresponding broadcast channel transmitted by the first cell; and
 the first cell and the second cell have the same Cell ID, and at least some of the first set of resources are the same as some of the second set of resources.

The wireless communication system may further comprise a terminal, configured to communicate with the base station via the second cell.

According to a third aspect of the present invention, there is provided a base station arranged to provide a first cell comprising a first set of resources and a second cell comprising a second set of resources; wherein
 a broadcast channel transmitted by the second cell differs from the corresponding broadcast channel transmitted by the first cell; and
 the first cell and the second cell have the same Cell ID, and at least some of the first set of resources are the same as some of the second set of resources.

According to a fourth aspect of the present invention, there is provided a terminal for use in a wireless communication system wherein a base station is arranged to provide a first cell comprising a first set of resources and a second cell comprising a second set of resources, a broadcast channel transmitted by the second cell differing from the corresponding broadcast channel transmitted by the first cell, the first cell and the second cell having the same Cell ID, and at least some of the first set of resources being the same as some of the second set of resources; wherein
 the terminal is configured to communicate with the base station via the second cell.

The above terminal may be a MTC device.

According to a further aspect of the present invention there are provided computer-readable instructions which, when executed by a processor of a transceiver device in a wireless communication system, cause the device to provide the base station or the terminal as defined above.

Thus, embodiments of the present invention provide for two cells in an LTE system to co-exist in the same time/frequency resources with the same Cell ID. The two cells will typically (but need not necessarily) be supported from the same site and have overlapping coverage. The two cells are differentiated by one being a legacy cell and the other being a cell in which coverage extension by means of signal repetition is applied. There is a corresponding difference in broadcast control channels transmitted by the two cells. The second cell is intended for machine type communication where coverage enhancement is required.

The invention has advantages such as the following. Transmission properties of channels provided by the co-existing legacy cell and new cell can be compatible, since they are both determined according to the same Cell ID. Interference between transmissions in the two cells can easily be avoided. Existing cell selection procedures can be applied with some modification to include the new cell type. Existing handover procedures can be used to switch from one cell to another with some modification to include the new cell type In general, and unless there is a clear intention to the contrary, features described with respect to one aspect of the invention may be applied equally and in any combination to any other aspect, even if such a combination is not explicitly mentioned or described herein.

As is evident from the foregoing, the present invention involves signal transmissions between a terminal and a base station in a wireless communication system. The "terminal" referred to here, also referred to as a subscriber station or UE, may take any form suitable for transmitting and receiving such signals. For the purpose of visualising the invention, it may be convenient to imagine the terminal as a mobile handset but no limitation whatsoever is to be implied from this. In preferred embodiments of the present invention, the base station will typically take the form proposed for implementation in the 3GPP LTE and 3GPP LTE-A groups of standards, and may therefore be described as an eNB (eNB) (which term also embraces Home eNB or HeNB) as appropriate in different situations. However, subject to the functional requirements of the invention, the base station may take any other form suitable for transmitting and receiving signals from terminals.

BRIEF DESCRIPTION OF THE DRAWINGS

Reference is made, by way of example only, to the accompanying drawings in which.

DETAILED DESCRIPTION

The following description will refer to "UEs", but it should be understood that this term includes MTC devices. MTC devices can be regarded as one class of UEs, to which the present invention is particularly relevant, although the present invention is applicable to other classes of UEs. UEs will need to be suitably equipped and configured in order to take advantage of the invention, although it remains compatible with existing UEs, henceforth referred to as "legacy" UEs which communicate with "legacy" cells.

In the prior art, it might be possible for an eNB to create an additional cell for coverage extension, but this would require resources to be available for the new cell. Reserving a set of resources only for coverage extension would be inefficient. If such a new cell used the same resources as an existing cell and a different cell ID, there would be conflict between at least some of the essential signals required to operate the two cells: for example at least some signals from the two cells would be present in the same DL, or UL, resource elements.

The invention is based on the recognition that coverage extension can be provided using an existing legacy cell as a basis by creating an additional new type of cell using the same resources, with the same Cell ID (PCI), but where coverage extension (e.g. using repetition) is applied to some or all of the physical channels. Since legacy UEs will not be configured to detect the repetitions or other measure(s) used for the coverage extension, this will result in the new type of cell not being accessible to legacy UEs. However, both new and legacy UEs can use (or be granted) any of the same resources as provided by the associated co-existing legacy cell, since both cells would be under the control of the same eNB. A given resource element can be dynamically configured to be used by either cell in any given subframe, but not by both cells at the same time.

Signalling to UEs, used to initiate use of one of the new cells, should include an indication that the cell is of the new type. Explicit changes to cell selection may not be required, however. The data rate on the new cell would in general be lower than that available on the legacy cell; thus, if both cells are detectable a UE would be better served by the legacy cell.

This has advantages such as the following:

Existing cell selection procedures can be applied with some modification (see below) to include the new cell type Existing handover procedures can be used to switch from one cell to another with some modification to include the new cell type Transmission properties of channels provided by the co-existing legacy cell and new cell can be compatible, since they are both determined according to the same cell ID Interference between transmissions in the two cells can be easily avoided.

The proposed scheme may invite comparison with cell range extension (CRE) in LTE. The current CRE operates by biasing the cell selection towards the cell with extended coverage. It does not typically improve the SINR for any UE served by that cell, but allows the UE to remain in the serving cell with lower SINR than would be the case without CRE. By contrast, embodiments of the present invention improve the SINR by signal repetition, especially but not exclusively for MTC device coverage enhancement.

The MTC coverage enhancement by repetition can be provided for any UEs, but it is more efficient to use it only for cell edge UEs, since the repetitions use extra resources, and are not needed for all UEs. As already mentioned, there would be no advantage to a UE to select the new cell in preference to the legacy cell where both are available; however, if necessary, network control or UE preference could be used to manage access to the network cell.

The proposed cells sharing a common cell ID need not have the same coverage foot print, as repetitions of physical channels should allow signals in the new cell to penetrate further. The new cell could fill coverage holes in or between legacy cells (such as locations with high path loss including lifts or basements of buildings). Thus, the coverage enhancement by repetition may allow coverage in locations that cannot be served by any legacy cells. Also, in general the coverage footprint of a cell may be different for different UEs. As another example, a normal UE (with two antennas) at a given location may be in coverage for the legacy cell. A low cost MTC UE may have only one antenna so at the same location may be out of coverage for the legacy cell, but in coverage for the enhanced coverage cell.

Figure 5:
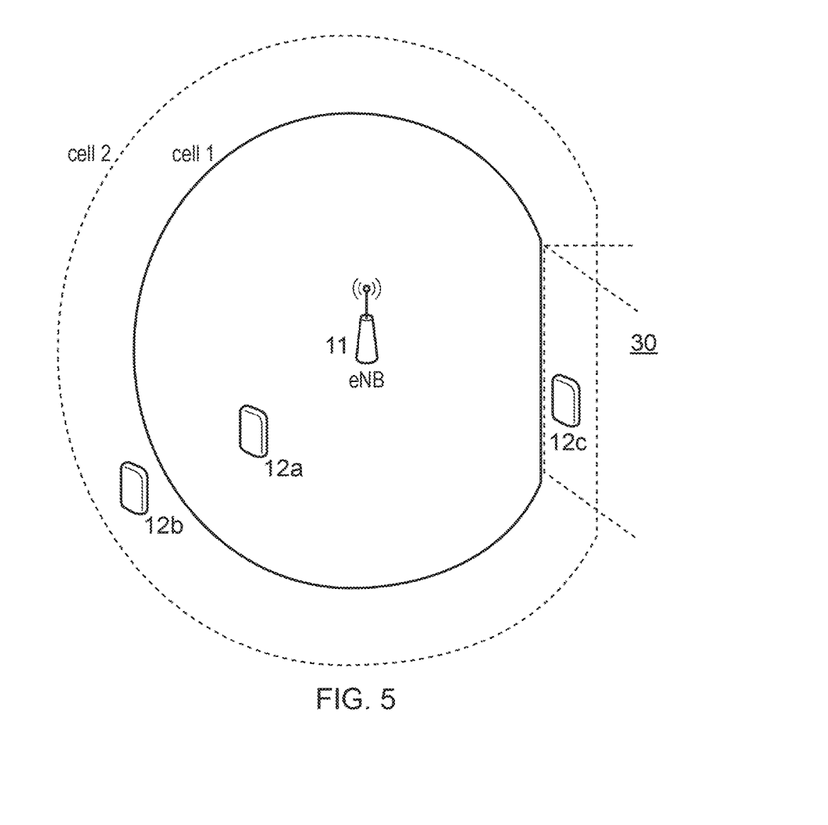
FIG. 5 schematically shows the principle of the invention.

The principle is shown schematically in FIG. 5. An eNB 11 provides two cells: a legacy cell, cell 1 with a cell border indicated by the solid line; and a second cell, cell 2, with a cell border shown by the dashed line. A UE 12a is within the range of both cell 1 and cell 2. It is therefore able to detect cell 1 and, depending on its capabilities, also cell 2. Another UE 12b is outside the coverage area of cell 1, but within that of cell 2. Assuming that UE 12b is suitably configured, it can detect cell 2 but not cell 1. Cell 2 therefore provides coverage extension for UE 12b by having a larger coverage footprint compared with cell 1. UE 12c is inside a building 30 which is creating a coverage hole of cell 1 (or between cell 1 and an adjacent neighbour cell, not shown). However, cell 2 is able to penetrate this coverage hole sufficiently to allow access by UE 12c. UE 12c could be, for example, an MTC device in the form of a vending machine deep inside the building. Although the proposed scheme is intended for MTC in LTE, it is not limited to such applications.

In general, unless otherwise indicated, the embodiments described below are based on LTE Release 11, where the network operates using FDD and comprises one or more eNodeBs, each comprising a number of physical antennas and controlling one or more downlink cells, each downlink cell having a corresponding uplink cell. Each DL cell may serve one or more terminals (UEs) which may receive and decode signals transmitted in that serving cell. In order to control the use of transmission resources in time, frequency and spatial domains for transmission to and from the UEs, the eNodeB sends control channel messages (PDCCH) to the UEs. A PDCCH message typically indicates whether the data transmission will be in the uplink (using PUSCH) or downlink (using PDSCH), it also indicates the transmission resources, and other information such as transmission mode, number of antenna ports, data rate, number of codewords enabled. In addition PDCCH may indicate which reference signals may be used to derive phase reference(s) for demodulation of a DL transmission. Reference signals for different antenna ports, but occupying the same locations, are distinguished by different spreading codes.

An eNB provides two cells which can share the same time/frequency resources, and using the same cell ID (as described in section 3). The first cell is a legacy (Rel-11) cell. The second cell is a new type of cell differentiated by (additional) repetition being applied to at least some transmissions, compared to the same transmission from the first cell. The PBCH for the second cell could differ from that in the first cell in terms of one or more of:

The presence of additional repetitions of the same information as the PBCH for the first cell A different signal structure Different information from the PBCH of the first cell The cells share the same CRS, at least in the region where resources may be shared.

One issue here is how to distinguish measurements reported by the UE on the first and second cells having the same cell ID. It can be assumed that RSRP based only on CRS would be the same for both cells. There are some possibilities to distinguish between reports for the two cells, such as:

Provide an additional type of measurement report for coverage extended cell

Add an indication to the report that it is for a coverage extended cell

Add an indication of error rate in receiving the PBCH

Require that the PBCH must be received before reporting RSRP for a second cell, and apply an offset to the RSRP for the second cell
depending on the number of repetitions on the PBCH or
depending on information signalled In the PBCH Provide the same RSRP value but different RSRQ measurement values for first and second cells Extend the range of cell IDs to allow a different set of numbers for second cells. If a new type of PBCH is detected, by:
adding an extra bit to the reported physical cell ID or
using a new range of values for the cell ID reported to the network e.g. 505 to 1008.

Figure 6:
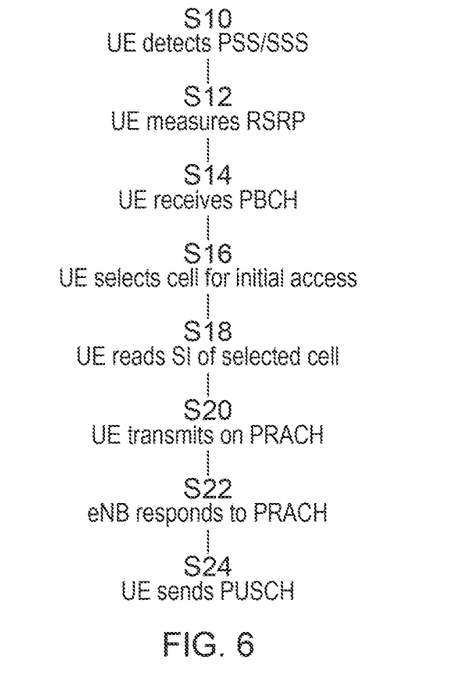
FIG. 6 is a flowchart of a procedure in embodiments.

In outline, the initial access procedure in embodiments (assuming the UE is capable of selecting a suitable cell with coverage extension) is shown in FIG. 6 and comprises the following steps.

Step S10. UE detects PSS/SSS for one or more cells. As already mentioned, the sequences used for PSS and SSS indicate the Cell IDs. In the case of the first and second cells of the invention, both cells share the same PSS/SSS and therefore have the same cell ID.

Step S12. UE measures RSRP for the cells on which PSS/SSS is detected. If it can detect the presence of the new cell, it can add an appropriate indication in any report concerning that cell.

Step S14. UE receives PBCH for one or more of the cells for which PSS/SSS is detected.

By blind decoding trials (e.g. using CRS mask and/or data in MIB), the UE determines:
number of CRS antenna ports (1, 2, or 4)
system frame number (SFN)
and in the case of the new type of cell:
Any additional information carried the new type of PBCH and/or
The number of additional time/frequency domain repetitions applied to PBCH (e.g. 1, 2, 4, or 8)

It should be noted that a legacy UE would not detect the new type of PBCH, or the repetitions. The new cell and a legacy cell may share one repetition of PBCH, or the new cell may have a completely distinct PBCH. Either way a legacy UE will not expect the locations and/or structure of the new PBCH. On the other hand, a suitably-configured UE ("new" UE, an MTC device for example) could detect both.

Step S16. UE selects a cell for initial access based on a metric such as highest RSRP, and whether PBCH is received correctly.

Using both conditions allows selection between the first and second cells. If PBCH from the first cell is received as well as PBCH from the second cell, then only the first cell should be selected. If PBCH is only received from the second cell, then the second cell should be selected. For cells where additional PBCH repetition is detected an offset may be applied to RSRP in the selection process, e.g. to decrease the effective measured power in proportion to the number of repetitions. This would have the effect of introducing (among cells of equivalent RSRP) a preference for cells with no repetition.

Step S18. UE reads System Information for the selected cell (either via repeated legacy SIBs or new SIBs, depending on the embodiment).

Step S20. PRACH is transmitted by the UE, with a power level/repetitions e.g. based on RSRP and repetition factor of PBCH. To distinguish PRACH intended for the new cell from PRACH for the legacy cell, The eNB may allocate different PRACH signatures for use in the two cells, or detect an uplink intended for the second cell by listening for the repetitions.

Step S22. PRACH may be re-transmitted, typically with power ramping, until a response is received from the eNB (the response is indicated on PDCCH and transmitted on PDSCH, where repetitions are applied to PDCCH and PDSCH e.g. based on the repetition factor applied to PBCH).

Step S24. Based on the response from the eNB, UE sends PUSCH (e.g. with a repetition factor based on the repetition factor applied to PBCH).

The resource allocations for both cells are arranged not to collide (in both UL and DL). In the downlink typical collisions to avoid would be between any of: CRS, PDCCH, EPDCCH or PDSCH. In the uplink, typical collisions to avoid would be between any of: PRACH, PUCCH and PUSCH. This can be achieved If the resources In both cells are allocated by the same scheduler (e.g. both cells are controlled by the same eNB), or two schedulers (e.g. in different eNBs) but with close co-ordination.

Some more specific embodiments will now be described.

First Embodiment—Using PDCCH

In a first embodiment, an eNB provides the above mentioned "legacy" and "new" cells, also referred to as first and second cells, using the same set of antennas. Both cells use the same PSS/SSS transmission (that is, there is a PSS/SSS transmission common to both) and therefore share the same cell ID. Both cells have the same CRS transmission. In the first cell PBCH is transmitted according to LTE Rel 11. In the second cell, PBCH is transmitted with additional repetitions (that is, transmitting PBCH again with the same content) to improve coverage. Thus, PBCH contains the same information for both cells. The additional repetitions could occupy additional subframes within the existing repetition period of 40 ms, or the repetition period could be extended beyond 40 ms.

In one variation the PBCH transmission in the second cell comprises the PBCH transmitted in the first cell (i.e. the PBCH from the first provides one of the repetitions in the second cell, and the PBCH information contents are the same). Information about repetitions applied to various other channels could be indicated using reserved bits in the PBCH. Legacy UEs would not process these reserved bits.

In another variation the PBCH transmitted in the second cell is independent of the PBCH transmitted in the first cell (i.e. all the repetitions use different resources to the PBCH in the first cell, and the information contents can be different). This would make it possible, for example, to add different information to the PBCH of the new cell regarding the number of repetitions to be applied to various channels.

Both first and second cells are supported by the same physical antennas, and the same antenna ports are configured for CRS. The CRS locations are the same in both cells.

The system bandwidth is the same for both cells.

PDCCH occupies the same bandwidth and number of OFDM symbols for both cells, whilst avoiding conflict for the same resources except where the legacy transmission forms part of the new transmission. The PHICH configuration is also the same in both cells. Therefore the CCEs making up the PDCCH have the same mapping to resources in both cells.

In principle, providing the signal strength is sufficient all UEs will be able to detect the legacy transmission of PDCCH and PHICH (i.e., PDCCH, PHICH as transmitted on the legacy cell). However, only UEs capable of receiving the new versions of these channels as transmitted on the new cell, would be able to detect them.

In one variation the PCFICH or other signalling (MIB or SIB for example) is decoded to determine the number of OFDM symbols for PDCCH for both cells. In another variation the number of OFDM symbols for PDCCH is fixed in the second cell (i.e. if coverage extension is used). In this case 3 OFDM symbols would be a typical value, and the same value also applies in the first cell.

For a UE which selects the first cell for initial access the RACH procedure according to Release 11 is followed. For a UE which selects the second cell for initial access, the RACH procedure is modified to use repeated PRACH, and the UE receives the response via PDCCH.

In the case of a UE able to detect both the first and second cells, some mechanism is needed for the network to distinguish the cell for which PRACH is intended. This may be provided through the repetitions or by use of the higher-level Cell ID referred to earlier.

Second Embodiment—Using EPDCCH

As was mentioned earlier, EPDCCH is a new DL control channel using part of PDSCH resources, to relieve congestion on the existing PDCCH. In this embodiment, EPDCCH may be transmitted in both cells, but with repetition (coverage extension) only in the new cell. PDCCH is transmitted in the legacy cell, but is not needed in the new cell.

Thus, the second embodiment is like the first embodiment except that the UE only receives EPDCCH and not PDCCH in the new cell.

Depending on the variation, the EPDCCH configuration may be determined by default or broadcast, e.g. indicated in a SIB, or indicated as one of a few pre-defined configurations in the MIB.

Depending on the variation, the number of OFDM symbols assumed for the control region of the DL transmission (i.e. PDCCH) may be determined by default or broadcast e.g. indicated in the MIB or a SIB. If determined by default a suitable value would be 3. This aspect is required so that the UE can be aware of which OFDM symbols are available for PDSCH.

In a variation of this embodiment, the system bandwidths for the first and second cells may be different. The difference may be determined by default or broadcast e.g. indicated in the MIB or a SIB. If determined by default the bandwidth for the second cell may be fixed at the smallest available value (1.4 MHz) or the smaller of a fixed value (e.g. 3 MHz) and the system bandwidth of the first cell.

As a further variation, the carrier frequencies of the first and second cells may be different.

Third Embodiment—Using Different Antenna Patterns

The third embodiment is like the second embodiment except that different antenna configurations are used for transmission of PBCH in the second cell compared with the first cell. This allows the second cell to be better adapted for MTC devices for example having only one receive antenna (and which thus are unable to take advantage of some transmission schemes such as MIMO which may be in use in the first cell).

PBCH in the second cell may be transmitted with beamforming to increase the signal strength. The beamforming pattern may be arranged to be time-varying, for example to cyclically cover different parts of the geographical area served by the first cell, for example with one beam pattern per subframe and two or four different beam patterns. The reference signals used for demodulation of PBCH transmitted in the second cell are different to the CRS as used for PBCH in the first cell.

In a variation, the PBCH transmitted in the first cell (without beamforming) is used as one of the repetitions in the second cell (with beamforming).

The PSS/SSS will normally be the same for both first and second cells. However, it would be possible to supplement PSS/SSS with additional repetitions or signals for the second.

Figure 7:
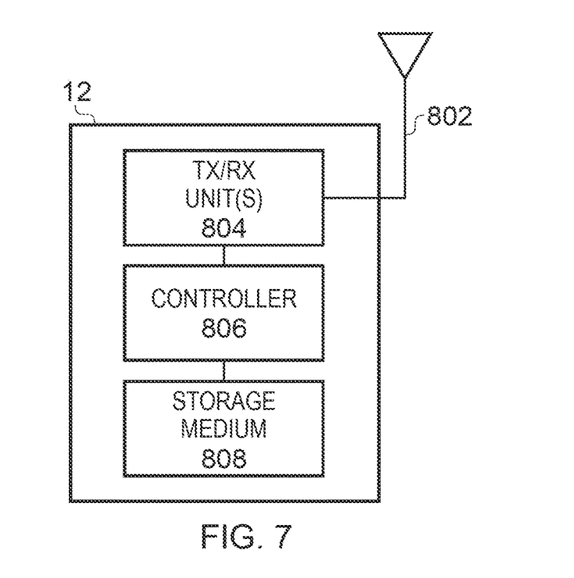
FIG. 7 is a schematic diagram of a UE to which the present invention may be applied.

FIG. 7 is a block diagram illustrating an example of a UE 12 to which the present invention may be applied. The UE 12 may include any type of device which may be used in a wireless communication system described above and may include cellular (or cell) phones (including smartphones), personal digital assistants (PDAs) with mobile communication capabilities, laptops or computer systems with mobile communication components, and/or any device that is operable to communicate wirelessly. The UE 12 includes transmitter/receiver unit(s) 804 connected to at least one antenna 802 (together defining a communication unit) and a controller 806 having access to memory in the form of a storage medium 808. The controller 806 may be, for example, Microprocessor, digital signal processor (DSP), application-specific integrated circuit (ASIC), field-programmable gate array (FPGA), or other logic circuitry programmed or otherwise configured to perform the various functions described above, including detecting PSS/SSS of the new or legacy cell, measuring RSRP, selecting a cell and so on. For example, the various functions described above may be embodied in the form of a computer program stored in the storage medium 808 and executed by the controller 806. The transmission/reception unit 804 is arranged, under control of the controller 806, to receive PSS/SSS and PBCH, transmit on PRACH, and so forth as discussed previously.

Figure 8:
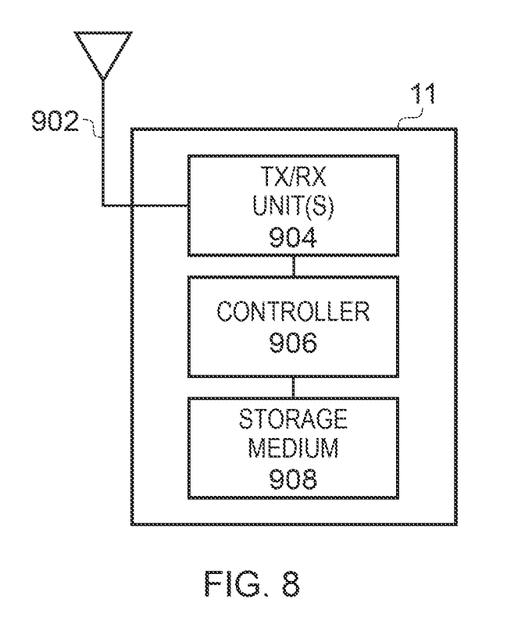
FIG. 8 is a schematic diagram of an eNB to which the present invention may be applied.

FIG. 8 is a block diagram illustrating an example of an eNB 11 to which the present invention may be applied. The eNB 11 includes transmitter/receiver unit(s) 904 connected to at least one antenna 902 (together defining a communication unit) and a controller 906. The controller may be, for example, Microprocessor, DSP, ASIC, FPGA, or other logic circuitry programmed or otherwise configured to perform the various functions described above, including broadcasting PSS/SSS and PBCH of the legacy cell and new cell, receiving PRACH from the UE and responding, and so forth. For example, the various functions described above may be embodied in the form of a computer program stored in the storage medium 908 and executed by the controller 906. The transmission/reception unit 904 is responsible for UE-specific signalling and broadcast messages under control of the controller 906.

To summarise, embodiments of the present invention allow two cells in an LTE system to co-exist in the same time/frequency resources with the same Cell ID (PCI). As already mentioned, PCI is derived from PSS/SSS, with up to 504 different values In LTE, and the same value is used for both cells within the Physical Layer. For other purposes, the two cells could have different IDs at a higher layer (I.e. the higher layer parameter Cellidentity (28 bits for LTE, broadcast in SIB1), or an extended physical cell ID for the second cell (e.g. from 505 to 1008).

The two cells are differentiated by one being a legacy cell and the other being a cell in which coverage extension by means of signal repetition is applied. There is a corresponding difference in broadcast control channels transmitted by the two cells, for example a difference in one or more of the contents of the PBCH, or the repetition factor on the PBCH, and/or a difference in a higher-level ID. The second cell is primarily intended for machine type communication where coverage enhancement is required.

Various modifications are possible within the scope of the invention.

The invention has been described with reference to LTE/LTE-A but could also be applied to other communications systems such as UMTS and WiMAX.

The term "cell" is to be interpreted broadly. Whilst a "cell" generally implies both a DL and UL, this is not necessarily the case and the present invention may be applied to a DL-only, or UL-only cell (legacy cell and/or or new cell).

The above embodiments refer to first and second cells in which the present invention is applied to add one new cell (the second cell) to a legacy, first, cell for coverage extension. However, the present invention is not limited to this arrangement. For example it would be possible to apply the principle twice in the same cell, adding a second cell as already mentioned but also a third cell using the same principle but with even further range (achieved by additional repetition).

Moreover, one eNB may control multiple cells. The present invention may be applied to any or all of the cells controlled by the same eNB. It would also be conceivable to apply the present invention between different eNBs, for example with a second eNB supplying the second cell corresponding to a first cell of a first eNB, although backhaul delays would make it difficult to provide the necessary co-ordination of resource use.

Handover would be required or at least desirable if a MTC device communicating via the new cell of the invention moves into coverage of a normal/legacy cell (since communication without repetition will be more efficient). Configuring the UE to report a PCI above 504 to higher layers as mentioned above would facilitate handover, or the above mentioned higher-level cell ID could be used.

Any of the embodiments and variations mentioned above may be combined in the same system. Features of one embodiment may be applied to any of the other embodiments.

In any of the aspects or embodiments of the invention described above, the various features may be implemented in hardware, or as software modules running on one or more processors.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

It is to be understood that various changes and/or modifications may be made to the particular embodiments just described without departing from the scope of the claims.

INDUSTRIAL APPLICABILITY

The invention therefore provides coverage extension by providing a new cell co-existing with an existing cell in a wireless communication system and sharing the same cell ID. This has various advantages. Transmission properties of channels provided by the co-existing legacy cell and new cell can be compatible, since they are both determined according to the same Cell ID. Interference between transmissions in the two cells can easily be avoided. Existing cell selection procedures can be applied with some modification to include the new cell type. Existing handover procedures can be used to switch from one cell to another with some modification to include the new cell type.

What is claimed is:

1. A transmission method for use in a wireless communication system the method comprising:
   providing by a base station a first cell having a Cell ID and comprising a first set of resources;
   providing by the base station a second cell having a Cell ID and comprising a second set of resources;
   transmitting a broadcast channel in each of the first and second cells to a terminal, wherein
   the broadcast channel for the second cell is different from that for the first cell, the Cell ID of the first cell is the same as the Cell ID of the second cell, and at least some of the first set of resources are the same as some of the second set of resources; and
   transmitting by a terminal on a Random Access Channel (RACH) in the second cell with a number of repetitions applied to RACH transmission based on information broadcast by the second cell, or the number of repetitions applied to a channel transmitted by the second cell.

2. The method according to claim 1 wherein the broadcast channel transmitted by the second cell differs in a number of repetitions from the broadcast channel transmitted by the first cell.

3. The method according to claim 1 wherein the broadcast channel transmitted by the second cell differs in information content from the broadcast channel transmitted by the first cell.

4. The method according to claim 1 wherein the second cell is provided for coverage extension with respect to a coverage area of the first cell.

5. The method according to claim 1 wherein the wireless communication system is based on Long-Term Evolution (LTE) and the broadcast channel includes a Physical Broadcast Channel, PBCH.

6. The method according to claim 1 wherein the wireless communication system is based on LTE and the broadcast channel includes a System Information Block, SIB.

7. The method according to claim 1 wherein additional channels are transmitted in the first and second cells, at least some of said broadcast channels and/or said additional channels being transmitted using the same antennas of a plurality of antennas of the base station.

8. The method according to claim 1 wherein different antenna configurations of the same base station are used for transmission of the broadcast channels of the first and second cells.

9. The method according to claim 8 wherein the broadcast channel in the second cell is transmitted using beamforming with a time-varying beamforming pattern.

10. A wireless communication system comprising:
a base station arranged to provide a first cell having a Cell ID and comprising a first set of resources and a second cell having a Cell ID and comprising a second set of resources; wherein
the first and second cells each transmit a broadcast channel to a terminal, the broadcast channel for the second cell is different from that for the first cell,
the Cell ID of the first cell is the same as the Cell ID of the second cell, and at least some of the first set of resources are the same as some of the second set of resources; and
the terminal is configured to transmit on a Random Access Channel (RACH) in the second cell, with a number of repetitions applied to RACH transmission based on information broadcast by the second cell, or the number of repetitions applied to a channel transmitted by the second cell.

11. A base station comprising:
a processor configured to execute instructions to:
provide a first cell having a Cell ID and comprising a first set of resources and a second cell having a Cell ID and comprising a second set of resources;
a transmitter configured to transmit information on broadcast channel in each of the first and second cells to a terminal, wherein the broadcast channel for the second cell is different from that for the first cell; and
the Cell ID of first cell is the same as the Cell ID of the second cell, and at least some of the first set of resources are the same as some of the second set of resources, wherein by information broadcast by the second cell, or the number of repetitions applied to a channel transmitted by the second cell, the base station informs the terminal of a number of repetitions to be applied to Random Access Channel (RACH) transmission in the second cell.

12. A terminal for use in a wireless communication system comprising:
a receiver configured to receive information on broadcast channels by a first and second cell provided by a base station; and
a transmitter configured to transmit on a Random Access Channel (RACH) in the second cell with a number of repetitions applied to the RACH transmission based on information on the broadcast channel in the second cell transmitted from the base station, or the number of repetitions applied to a channel in the second cell transmitted from the base station,
wherein the first cell has a Cell ID and comprises a first set of resources and the second cell has a Cell ID and comprises comprising a second set of resources, the broadcast channel for the second cell is different from that for the first cell, the Cell ID of the first cell is the same as the Cell ID of the second cell, and at least some of the first set of resources being the same as some of the second set of resources.

13. A non-transitory computer-readable recording media storing computer-readable instructions which, when executed by a processor of a base station in a wireless communication system, cause the base station to provide functions of:
providing a first cell having a Cell ID and comprising a first set of resources and a second cell having a Cell ID and comprising a second set of resources; and
transmitting information on a broadcast channel in each of the first and second cells to a terminal, wherein the broadcast channel for the second cell is different from that for the first cell, the Cell ID of the first cell is the same as the Cell ID of the second cell, and at least some of the first set of resources are the same as some of the second set of resources, and wherein
by information broadcast by the second cell, or the number of repetitions applied to a channel transmitted by the second cell, the base station informs the terminal of a number of repetitions to be applied to Random Access Channel (RACH) transmission in the second cell.

* * * * *

UNITED STATES PATENT AND TRADEMARK OFFICE
CERTIFICATE OF CORRECTION

PATENT NO.       : 10,390,198 B2                                              Page 1 of 1
APPLICATION NO.  : 15/209329
DATED            : August 20, 2019
INVENTOR(S)      : Timothy Moulsley It is certified that error appears in the above-identified patent and that said Letters Patent is hereby corrected as shown below:

In the Claims

Column 18, Line 15 "comprises comprising a" should read "comprises a"

Signed and Sealed this
Third Day of March, 2020

Andrei Iancu
*Director of the United States Patent and Trademark Office*